United States Patent
Pike, Sr.

(10) Patent No.: US 10,167,228 B2
(45) Date of Patent: Jan. 1, 2019

(54) LITHIUM INFUSED RAW FLY ASH FOR THE PRODUCTION OF HIGH STRENGTH CEMENTITIOUS PRODUCTS

(71) Applicant: VHSC, Ltd., Tortola (VG)

(72) Inventor: Clinton Wesley Pike, Sr., Montgomery, TX (US)

(73) Assignee: VHSC, LTD., Tortola (VG)

( * ) Notice: Subject to any disclaimer, the term of this patent is extended or adjusted under 35 U.S.C. 154(b) by 307 days.

(21) Appl. No.: 14/966,707

(22) Filed: Dec. 11, 2015

(65) Prior Publication Data

US 2017/0166482 A1  Jun. 15, 2017

(51) Int. Cl.
C04B 28/02 (2006.01)
C04B 28/06 (2006.01)
C04B 111/20 (2006.01)

(52) U.S. Cl.
CPC ............ *C04B 28/021* (2013.01); *C04B 28/06* (2013.01); *C04B 2111/2023* (2013.01); *Y02W 30/91* (2015.05)

(58) Field of Classification Search
CPC .................. C04B 28/021; C04B 28/06; C04B 2111/2023
See application file for complete search history.

(56) References Cited

U.S. PATENT DOCUMENTS

| | | | |
|---|---|---|---|
| 2,021,623 A | 11/1935 | Breerwood | |
| 2,564,690 A | 8/1951 | Havelin et al. | |
| 3,565,648 A | 2/1971 | Mori et al. | |
| 3,852,084 A | 12/1974 | Webster et al. | |
| 4,018,619 A | 4/1977 | Webster et al. | |
| 4,054,463 A | 10/1977 | Lin | |
| 4,470,850 A | 9/1984 | Bloss | |
| 4,482,096 A | 11/1984 | Lin | |
| 4,679,736 A | 7/1987 | Orlando | |
| 4,887,773 A | 12/1989 | Mehltretter | |
| 4,926,944 A | 5/1990 | Schilling | |
| 5,714,002 A | 2/1998 | Styron | |
| 5,766,339 A | 6/1998 | Babu et al. | |
| 5,988,396 A | 11/1999 | Minkara et al. | |
| 5,997,632 A * | 12/1999 | Styron .................. C04B 28/021 106/705 |
| 6,099,816 A | 8/2000 | College et al. | |
| 6,251,178 B1 * | 6/2001 | Styron .................... C04B 22/10 106/706 |
| 6,482,258 B2 * | 11/2002 | Styron .................... C04B 28/04 106/706 |
| 6,634,576 B2 | 10/2003 | Verhoff et al. | |
| 6,730,161 B2 | 5/2004 | Lasshmanan et al. | |
| 6,802,898 B1 | 10/2004 | Liskowitz et al. | |
| 6,890,507 B2 | 5/2005 | Chen et al. | |
| 6,936,098 B2 | 8/2005 | Ronin | |
| 7,240,867 B2 | 7/2007 | Ronin | |
| 7,323,021 B2 | 1/2008 | Trass et al. | |
| 7,669,790 B2 | 3/2010 | Ronin | |
| 7,931,220 B2 | 4/2011 | Grasso, Jr. et al. | |
| 8,051,985 B2 | 11/2011 | Matsuo et al. | |
| 8,404,609 B2 * | 3/2013 | Seal ........................ C02F 1/283 502/401 |
| 8,967,506 B2 | 3/2015 | Pike, Sr. | |
| 9,254,490 B2 * | 2/2016 | Pike, Sr. ................. B02C 17/20 |
| 2003/0066461 A1 | 4/2003 | Chen et al. | |
| 2004/0247846 A1 | 12/2004 | Uzawa et al. | |
| 2005/0005823 A1 | 1/2005 | Gourley et al. | |
| 2006/0201395 A1 | 9/2006 | Barger et al. | |
| 2007/0034118 A1 | 2/2007 | Jardine et al. | |
| 2008/0308659 A1 | 12/2008 | Grasso, Jr. et al. | |
| 2009/0121052 A1 | 5/2009 | Ronin et al. | |
| 2009/0188998 A1 | 7/2009 | Anderson et al. | |
| 2012/0280069 A1 | 11/2012 | Pike, Sr. | |

FOREIGN PATENT DOCUMENTS

| | | |
|---|---|---|
| CN | 1974465 A | 6/2007 |
| CN | 100412020 C | 8/2008 |
| CN | 103056001 A | 4/2013 |
| CN | 103113088 A | 5/2013 |
| DE | 102005045803 A1 | 4/2007 |
| EP | 1688182 A1 | 8/2006 |
| RU | 2388710 C1 | 5/2010 |
| WO | 2009064244 A1 | 5/2009 |
| WO | 2014004943 A1 | 1/2014 |

OTHER PUBLICATIONS

Kosmatka et al, "Design and Control of Concrete Mixtures", Portland Cement Association, 2003, pp. 21-70, 79-127.
N. Bouzoubaa, "Mechanical properties and durability of concrete made with high-volume fly ash blended cements using a course fly ash", Cement and Concrete Research, vol. 31, pp. 1393-1402 (2001).
N. Bouzoubaa, "The effect of grinding on the physical properties of fly ashes and a Portland cement clinker", Cement and Concrete Research, vol. 27, No. 12, pp. 1861-1874 (1997).

* cited by examiner

Primary Examiner — Anthony J Green
(74) Attorney, Agent, or Firm — Hayes Soloway PC

(57) ABSTRACT

A method of producing high-strength cementitious product from raw fly ash by mixing the raw fly ash with a lithium compound, whereby milling of the raw fly ash to achieve requisite strength is unnecessary. It has now been found that by adding as little as 0.1% of lithium chloride to raw untreated Class C fly ash, one can achieve improved seven-day and twenty-eight-day compressive strength. At the very least, raw lithium treated Class C fly ash may be used at lower total cementitious content per yard of concrete as opposed to Ordinary Portland Cement (OPC) for improved compressive strength.

23 Claims, No Drawings

LITHIUM INFUSED RAW FLY ASH FOR THE PRODUCTION OF HIGH STRENGTH CEMENTITIOUS PRODUCTS

FIELD OF INVENTION

This invention relates to raw fly ash and, more particularly, to the infusion of lithium in fly ash to produce high-strength cementitious products.

BACKGROUND OF THE INVENTION

In coal-fired power stations, processes are employed to reduce the amount of $SO_2$ admissions from the combustion of coal. By switching to a lower sulfur coal, such as bituminous or lignite to subbituminous coal, one can lower the $SO_2$ emissions and the amount of fly ash produced per ton of coal burned. Since the fly ash produced from the burning of subbituminous coal produces an ASTM Class C fly ash, the amount of this type of fly ash has been growing throughout the U.S. as coal-fired power plants switch to this type of coal to meet $SO_2$ emission guidelines. Removal and disposal of this particular type of fly ash from coal-fired plants and the fly ash and other byproducts produced from the combustion of other fossil fuels has been costly, and efforts have been devoted to finding uses for the unprocessed raw fly ash which are commercially viable to offset removal costs.

While a large portion of raw fly ash is buried or carted off to landfills, the raw Class C fly ash has been used as backfill due to its ability to set up, for instance, within 30 minutes. However, this quick-setting characteristic of the fly ash is offset by the relatively low strength of the cement produced in this manner. For instance, in a seven-day test of raw Class C fly ash, the compressive strength is only 2,925 psi when run as per ASTM C 989 testing protocol when blended at 50% OPC/50% fly ash. This compressive strength is not generally acceptable as a good enough strength gain to use at Grade 120 slag replacement factors of 50%. It is desirable for high-strength cementitious products to have a compressive strength exceeding 5,000 psi in 7 days versus straight OPC which attains around 4,400-4,800 psi in 7 days, running the same ASTM C 989 test. Thus, this type of raw Class C fly ash cannot be used to replace cement at 50% or greater and attain a high-strength cementitious product that exhibits strengths that exceed Grade 120 slag strengths in 7 and 28 days.

It will be noted that cementitious products having compressive strength of greater than 5,000 psi in 7 days and over 7,000 in 28 days as measured by the C 989 test in general exceeds Grade 120 slag performance and is useful in a wide variety of high-strength cement applications. In fact, cements having a Grade 100 slag rating as measured by this test or better have proven to be satisfactory in some applications. Unfortunately, raw fly ash cannot approach such slag performance and is, therefore, relegated to patching and other backfill applications or much lower cement replacement factors than the normal 50% replacement factor.

Regardless of the strength characteristics of raw Class C fly ash, in the past, raw fly ash has been used in cements but at replacement concentrations of less than 25% by weight in which the raw fly ash replaces 25% or less of Ordinary Portland Cement (OPC). Regardless of strength considerations, this low replacement percentage renders raw fly ash not as desirable versus a high cement replacement-factor material as a practical matter.

SUMMARY OF THE INVENTION

It has now been found that by adding as little as 0.1% of lithium chloride to raw untreated Class C fly ash one can achieve a seven-day compressive strength of 5,577 psi and a 28-day compressive strength of 7,590 psi. This can be seen from the following table derived from testing under ASTM C 989 standards, where the raw fly ash was treated as shown:

|  | Water | Flow | Day 1 | Day 7 | Day 28 |
| --- | --- | --- | --- | --- | --- |
| Duck Creek (raw)(0.1%) Li | 178 | 110 | 2,680 | 5,577 | 7,590 |
| Duck Creek - Raw no treatment | 215 | 110 | 950 | 2,822 | 3,915 |
| Control Cement | 232 | 113 | 2,517 | 5,245 | 5,522 |

Note that for the seventh-day compressive test of lithium-treated raw Class C fly ash, there is an increase in compressive strength of 2,755 psi over raw untreated Class C fly ash, making raw lithium-treated Class C fly ash usable for high-strength cementitious applications. At the very least, raw lithium-treated Class C fly ash may be used at lower total cementitious content per yard of concrete as opposed to Ordinary Portland Cement which was 6% lower in 7 days and 37% lower in 28 days.

Moreover, it has been found that one can take Class F fly ash and add calcium-containing minerals to it to approximate Class C fly ash. In one embodiment, Class F fly ash can be mixed with Class C fly ash to attain around 17.5-20% total CaO of blended fly ash, thus containing total CaO that is a combination of Class C and Class F fly ash that then allows activation with lithium to provide a high-strength cement. It additionally has been found that a blend of raw Class F fly ash with 30% fly ash containing CaO mineral (Class C fly ash or others) by weight is optimal when lithium-activating blended raw fly ashes.

Further, one can mix raw Class C fly ash with raw Class F fly ash and add the lithium to activate the Class C faction and, thus, to provide strength to raw fly ash-derived cements.

In summary, it has been found that one can take raw fly ash and treat it with lithium to create high-strength cement without having to mill it.

It will be noted that Class F fly ash is defined as having greater than 70% iron, silica, and aluminum, with Class C fly ash being defined as having less than 70% of these constituents.

The above ability to strengthen raw fly ash makes the utilization of untreated raw fly ash not only economically feasible but capable of producing high-strength cementitious products.

Note, lithium comes in a variety of forms, including lithium hydroxide, lithium chloride, and lithium carbonate. It has further been found that lithium in its various forms has proven to be effective in the range of 0.05%-0.25%. Moreover, it has been found that by blending raw Class C fly ash with raw Class F fly ash, the blend when mixed with lithium can be given superior strength characteristics.

In one embodiment, the lithium is introduced in the form of lithium chloride at rates of 0.025% or higher that seem to react with Merwinite to form amorphous glass that is reactive and gives strength. This mineral is normally found in Class C fly ash. It appears that Class C fly ash regularly has amounts of Merwinite on the order of 8-25%. When lithium reacts with the Merwinite in the fly ash, it has been found that the strength of the cementitious material increased by 20% or more.

It appears that lithium strengthening of raw fly ash relates to reacting lithium with minerals in raw fly ash having a high calcium content.

In short, it has been found that mixing lithium chloride at 0.1% in raw fly ash results in cementitious material having strengths that exceed Grade 120 slag performance, even without the surface area increase provided by milling, especially in a multimedia mill, such as described in U.S. patent application Ser. No. 13/647,838, filed on Oct. 9, 2012. Moreover, it has been found that when utilizing this lithium/raw fly ash mixture to replace 60% of OPC, instead of the standard 50% replacement, under the ASTM C 989 testing protocol, a minimum Grade 100 slag performance is always achieved.

Thus, without having to mill raw fly ash to increase surface area, one can achieve high-strength cementitious products. In addition, this new cement, when used in downhole applications, is found to give cementitious strengths high enough to not use any OPC cement. Simply by intermixing the lithium with the Class C fly ash gives a cementitious material that alone can give enough strength to provide ample setting characteristics to supply all that is needed for this application.

As a byproduct of the use of lithium, its use also imparts significant alkali-silica reaction (ASR) remediation to the cementitious product. Thus, there is significant alkali-silica reaction reduction benefit when using fly ash infused with lithium.

Thus, lithium is mixed with raw fly ash to provide a high-strength cementitious product while at the same time achieving significant ASR reduction.

In summary, a method of producing high-strength cementitious product from raw fly ash is provided by mixing the raw fly ash with a lithium compound, whereby milling of the raw fly ash to achieve requisite strength is unnecessary.

DETAILED DESCRIPTION

Key to the imparting of strength to raw fly ash is keeping the percentage of the fly ash having calcium-containing minerals between 17.5 and 20% or greater. Class C fly ash, by itself, meets these requirements. If the presence of this fly ash exceeds 20%, there may be problems with ASR. Ordinarily, it is desirable to keep the percentage of calcium below 20% to eliminate ASR problems. However, with the addition of lithium and its proven ASR remediation, high percentages of calcium do not become problematic.

As mentioned above, calcium-rich minerals can exist in fly ash through the presence of Merwinite, and this mineral can react with Lithium to produce varying amounts of reactive amorphous glass. It has been found that most Class C fly ash has Merwinite and, when reacted with lithium compounds with water, appears to convert 35-50% of the Merwinite to a reactive glass. It is believed the net result of the existence of this mineral is that lithium reacts with this mineral in fly ash to activate the raw fly ash to achieve high strength.

As will be discussed, the range of lithium chloride in the fly ash can be from 0.05 to 0.25 wt % of lithium in fly ash.

As to raw Class F fly ash, raw Class F fly ash, for instance, from lignite is not high enough in calcium-rich minerals to be activated by lithium for providing the requisite strength. Thus, Class F fly ash, in general, does not lithium activate because the amount of calcium-rich mineral does not typically exceed 11-13% when the coal being fired is a lignite, bituminous, or anthracite, or combinations of such.

On the other hand, Powder River basin fuel, which is a relatively young coal and comes from Wyoming, has a calcium-rich mineral content of between 22 to 45% when burned. With lignite having no more than about 14% calcium-rich mineral content, when blended, for instance, with subbituminous coal, which has a calcium-rich mineral content considerably higher than other coals, the blending of the Class F fly ash from, for instance, lignite with subbituminous coal at a ratio of, for instance, 40% lignite to 60% subbituminous coal, results in a blended fuel that, when burned, produces a fly ash having a sufficient amount of calcium-rich mineral content to be activated in the raw fly ash to impart the aforementioned strength.

In general, Class F fly ash is defined to have iron, silica, and aluminum above 70% by weight, whereas if these elements are less than 70%, one has a Class C fly ash.

Thus, while the subject invention is described in terms of treating raw Class C fly ash with lithium chloride or other lithium compound, it is possible to create a blended mixture of Class C and Class F fly ash to achieve the strengths associated with the Class C fly ash. Moreover, in some cases, at certain power stations, just the blending of Powder River Basin coal with other coal before it is pulverized and then burned in the boiler may create a hybrid ash that, in itself, is reactive to lithium while being defined as a Class F fly ash.

The amount of lithium compound, be it lithium hydroxide, lithium fluoride, or lithium carbonate, is on the order of 0.1% to 0.2%. More than 0.2% of a lithium additive can make the process more expensive such that the practical limit for the amount of lithium compound is less than 0.2% by weight of fly ash. As mentioned hereinabove, raw fly ash from the Powder River basin fuel comes from a relatively young coal, generally available in Wyoming, which has a calcium-rich mineral content of between 22 and 45%. The Powder River basin coal may be subbituminous coal which has a greater percentage of calcium-rich mineral content than is found in all other coals. Thus, Powder River basin fuel fly ash can be mixed with raw Class F fly ash and lithium added to provide the required strength.

Note that fly ash need not come from coal-fired boilers; it can come from industrial boilers or similar coal-fired boilers. The fly ash in question can come from any source in which the minerals are milled down and end up in the mineral matter that the coal becomes once it is burned, with some burned pieces agglomerated at 2,500° F. or higher into raw fly ash. In short, while pure raw Class F fly ash from lignite coal is not high enough in calcium-rich mineral content, blends with raw Class C fly ashes can result in a total calcium-rich mineral content measured as CaO content exceeding 17.5% that results in sufficient strength for the raw fly ash blend. Moreover, because of the use of lithium and its ASR remediation, the amount of Class C fly ash is somewhat unrestricted.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended Claims.

What is claimed is:

1. A method for producing a cementitious product having a greater than Grade 100 slag performance, the method comprising:
    mixing raw fly ash with a lithium compound to produce the cementitious product, wherein 17.5% or greater of the raw fly ash includes calcium-containing minerals.

2. The method of claim 1, wherein the amount of the lithium compound is between 0.05-0.25% by weight of the raw fly ash.

3. The method of claim 1, wherein the amount of the lithium compound is in excess of 0.1% by weight of the raw fly ash.

4. The method of claim 1, wherein the raw fly ash is designated as Class C fly ash.

5. The method of claim 1, wherein the raw fly ash is Class F fly ash mixed with a fly ash including calcium-containing minerals.

6. The method of claim 5, wherein the fly ash including calcium-containing minerals is 30% by weight of the raw fly ash.

7. The method of claim 1, wherein the calcium-containing minerals include at least one of:
    an aluminum compound; and
    Merwinite having a weight concentration of between 8 and 25%.

8. The method of claim 1, wherein the lithium compound is selected from the group consisting of lithium hydroxide, lithium chloride, and lithium carbonate.

9. The method of claim 1, further comprising:
    mixing the raw fly ash and lithium compound mixture with Ordinary Portland Cement at a ratio of 60% raw fly ash and lithium compound mixture to 40% Ordinary Portland Cement.

10. The method of claim 1, wherein the raw fly ash is Class F fly ash derived from combustion of at least one of lignite and subbituminous coal.

11. The method of claim 10, wherein the Class F fly ash is derived from combustion of both lignite and subbituminous coal and is mixed at a ratio of 40% lignite ash to 60% subbituminous coal ash.

12. The method of claim 1, wherein the cementitious product has a greater than Grade 120 slag performance.

13. A cementitious product having a greater than Grade 100 slag performance, the cementitious product comprising:
    raw fly ash, wherein 17.5% or greater of the raw fly ash includes calcium-containing minerals; and
    a lithium compound.

14. The cementitious product of claim 13, wherein the raw fly ash includes either Class C fly ash or Class F fly ash.

15. The cementitious product of claim 13, wherein the raw fly ash includes a blend of Class C fly ash and Class F fly ash.

16. The cementitious product of claim 13, wherein the amount of the lithium compound is between 0.05-0.25% by weight of the raw fly ash.

17. The cementitious product of claim 13, wherein the amount of the lithium compound is in excess of 0.1% by weight of the raw fly ash.

18. The cementitious product of claim 13, wherein the lithium compound is selected from the group consisting of lithium hydroxide, lithium chloride, and lithium carbonate.

19. The cementitious product of claim 13, wherein the raw fly ash is Class F fly ash derived from combustion of at least one of lignite and subbituminous coal.

20. The cementitious product of claim 19, wherein the Class F fly ash is derived from combustion of both lignite and subbituminous coal and is mixed at a ratio of 40% lignite ash to 60% subbituminous coal ash.

21. The cementitious product of claim 13, wherein the calcium-containing minerals include at least one of:
    an aluminum compound; and
    Merwinite having a weight concentration of between 8 and 25%.

22. The cementitious product of claim 13, wherein the raw fly ash is Class F fly ash mixed with a fly ash including calcium-containing minerals.

23. The cementitious product of claim 22, wherein the fly ash including calcium-containing minerals is 30% by weight of the raw fly ash.

* * * * *